(12) United States Patent
Haruki

(10) Patent No.: US 7,132,956 B2
(45) Date of Patent: Nov. 7, 2006

(54) ELECTRONIC APPARATUS AND REMOTE CONTROLLER

(75) Inventor: Kosuke Haruki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 340 days.

(21) Appl. No.: 10/762,803

(22) Filed: Jan. 20, 2004

(65) Prior Publication Data

US 2004/0150530 A1    Aug. 5, 2004

(30) Foreign Application Priority Data

Jan. 20, 2003   (JP)   ............... P2003-010860

(51) Int. Cl.
G08C 19/00 (2006.01)
H04Q 9/00 (2006.01)
H04N 7/18 (2006.01)
H04B 7/00 (2006.01)
H04L 17/02 (2006.01)

(52) U.S. Cl. .................. 340/825.72; 340/310.11; 340/825.74; 340/5.23; 340/5.64; 340/7.61; 725/74; 725/81; 725/82; 725/89; 455/41.2; 455/95; 341/176

(58) Field of Classification Search .......... 340/825.72, 340/310.11, 825.74, 5.23, 5.64, 7.61; 725/74, 725/81, 82, 89; 455/41.2, 95; 341/176
See application file for complete search history.

(56) References Cited

U.S. PATENT DOCUMENTS 5,838,314 A * 11/1998 Neel et al. ............... 725/8
6,141,702 A * 10/2000 Ludtke et al. ............ 710/5
6,195,797 B1 * 2/2001 Williams, Jr. ............ 725/74
6,237,049 B1 * 5/2001 Ludtke ..................... 710/8
6,259,707 B1 * 7/2001 Dara-Abrams et al. ..... 370/486
6,970,127 B1 * 11/2005 Rakib ...................... 341/173
2003/0195969 A1 * 10/2003 Neuman ................. 709/229

FOREIGN PATENT DOCUMENTS

| JP | 11-3166 | 1/1999 |
| JP | 11055655 A | 2/1999 |
| JP | 2000224673 A | 8/2000 |

* cited by examiner

Primary Examiner—Jeffery Hofsass
Assistant Examiner—Scott Au
(74) Attorney, Agent, or Firm—Foley & Lardner LLP

(57) ABSTRACT

A wireless AV station is furnished with an Internet browsing function, a TV viewing function, a TV recording and playback function and a message board function, and these multiple functions are activated by a command from a plurality of personal computers each operating as remote controllers, and/or a dedicated remote controller. A control portion executes exclusive control among multiple functions based on exclusive control data, so that concurrently available functions may be used independently by a plurality of remote controllers.

6 Claims, 9 Drawing Sheets

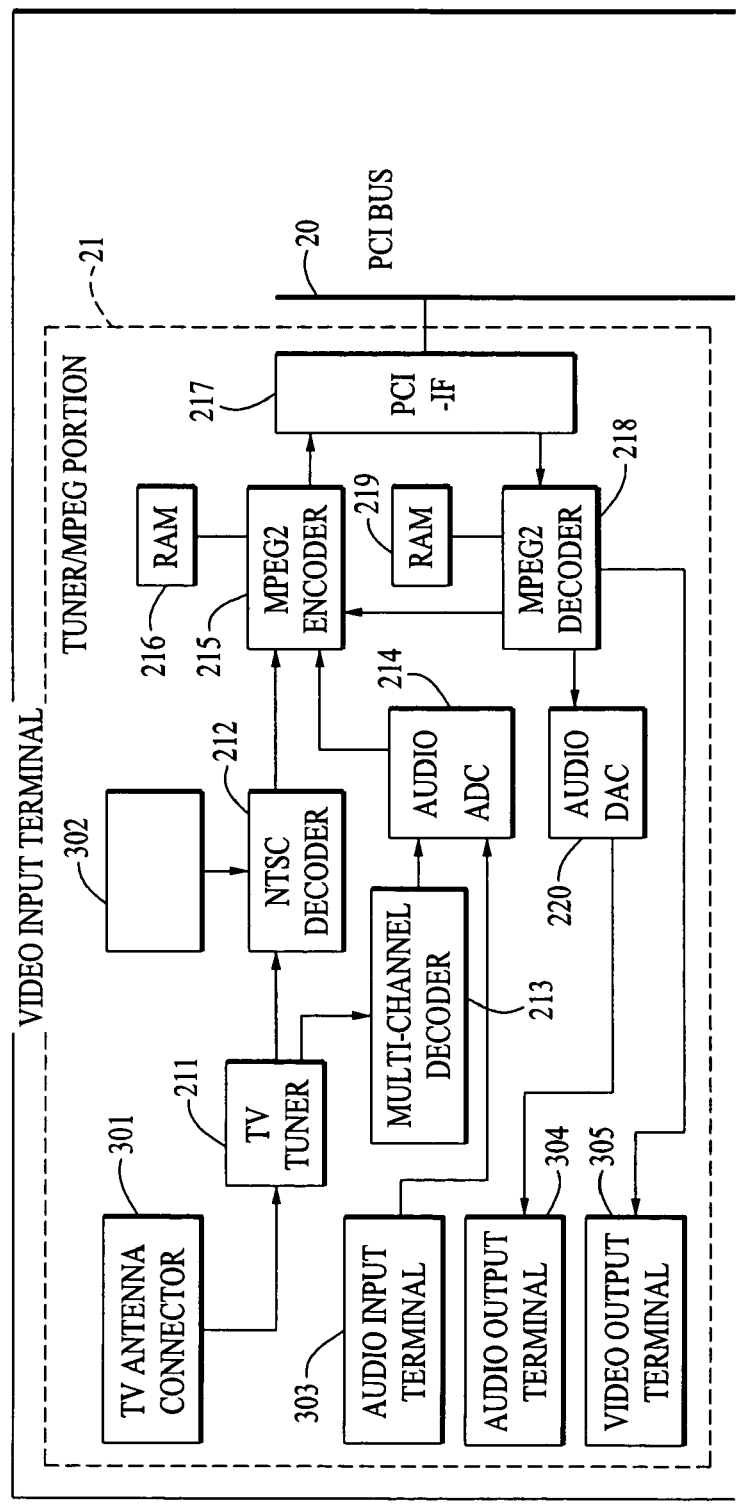

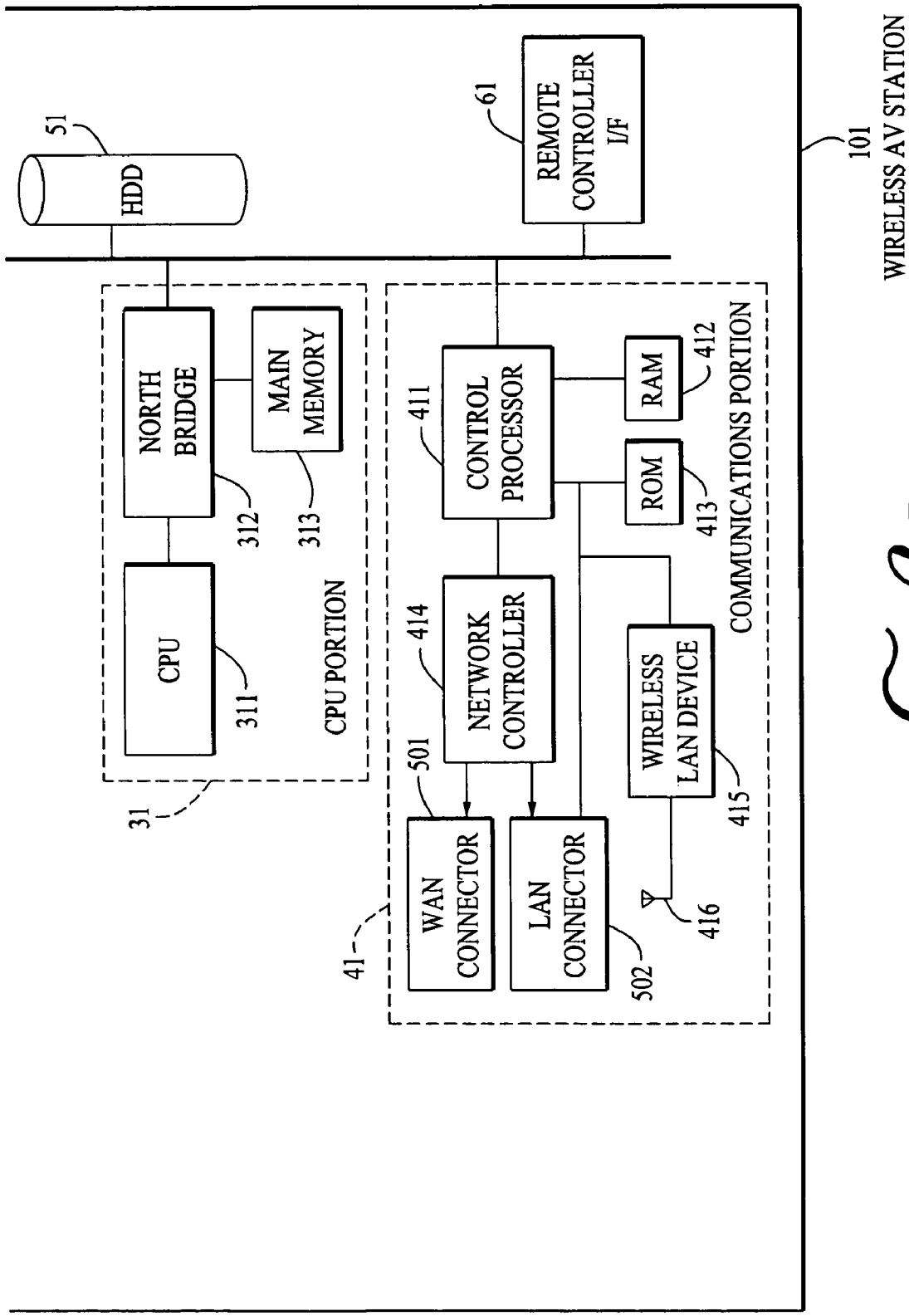
Fig. 2-B

| REQUESTED FUNCTION | FUNCTION NEEDING EXCLUSIVE CONTROL |
|---|---|
| FUNCTION A | FUNCTION C |
| FUNCTION B | — |
| FUNCTION C | FUNCTION A    FUNCTION D |
| ⋮ | ⋮ |

ELECTRONIC APPARATUS AND REMOTE CONTROLLER

This application is based upon and claims the benefit of priority from the prior Japanese Patent Application No. 2003-010860, filed Jan. 20, 2003, the entire contents of which are incorporated herein by reference.

BACKGROUND OF THE INVENTION

1. Field of the Invention

The present invention relates to a remote-control technique in consumer appliances, such as an HDD recorder, furnished with multiple functions including, for example, an audio playback function and a video recording function.

2. Description of the Related Art

With the improvement of the semiconductor manufacturing technique and the information processing technique in recent years, so-called consumer appliances are being made multifunctional at a fast pace. Most of the consumer appliances of this type are remotely controllable, and the user is able to use multiple functions by manipulating a single remote controller.

With the aim of managing and using multiple functions collectively, there have been proposed various schemes that make it possible to control a plurality of discrete devices by a single remote controller (for example, patent document JP-A-11-3166)

Incidentally, conventional consumer appliances are designed on the assumption that there is only one remote controller for remote-control operations. Hence, concurrent use of a function X by a user A and a function Y by a user B is not anticipated.

However, a wireless network technique that enables, for example, a cableless interconnection of a plurality of electronic appliances has been developing recently, and a plurality of personal computers interconnected through a network are becoming able to operate as a remote controller for remote-control operations.

The inventor has surmised that one day it will be common practice to control, for example, an HDD recorder furnished with an audio playback function and a video recording function, installed in the living room, such that user A may perform a manipulation for the audio playback function on his personal computer in his room while at the same time the user B may perform a manipulation for the video recording function on his personal computer in his room. However, such operations would require concurrent use of two remote controllers and resolving contention problems among them as well as problems of exclusive use of certain functions dependent on the particular hardware and functions desired to be controlled.

The invention was devised in view of the foregoing, and therefore has an object to provide an electronic appliance and a remote controller that enable concurrent, independent use of multiple functions by a plurality of remote controllers.

BRIEF SUMMARY OF THE INVENTION

The invention provides an electronic appliance furnished with multiple functions that are remotely controllable by a plurality of remote controllers, and the electronic appliance includes control unit for accepting a request from a second remote controller and activating a second function while activating a first function at a request from a first remote controller.

The invention also provides a remote controller used to remotely control an electronic appliance furnished with multiple functions, and the remote controller includes: display means; receiving means for receiving a notice from the electronic appliance that one or more than one of the multiple functions has become unavailable; and notifying means for notifying a user, through the display means, that one or more than one function specified in the notice received at the receiving means has become unavailable.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a view depicting an appliance configuration of the wireless AV station according to the embodiment.

DETAILED DESCRIPTION OF THE INVENTION

The following description will describe one embodiment of the invention with reference to the accompanying drawings.

Figure 1:
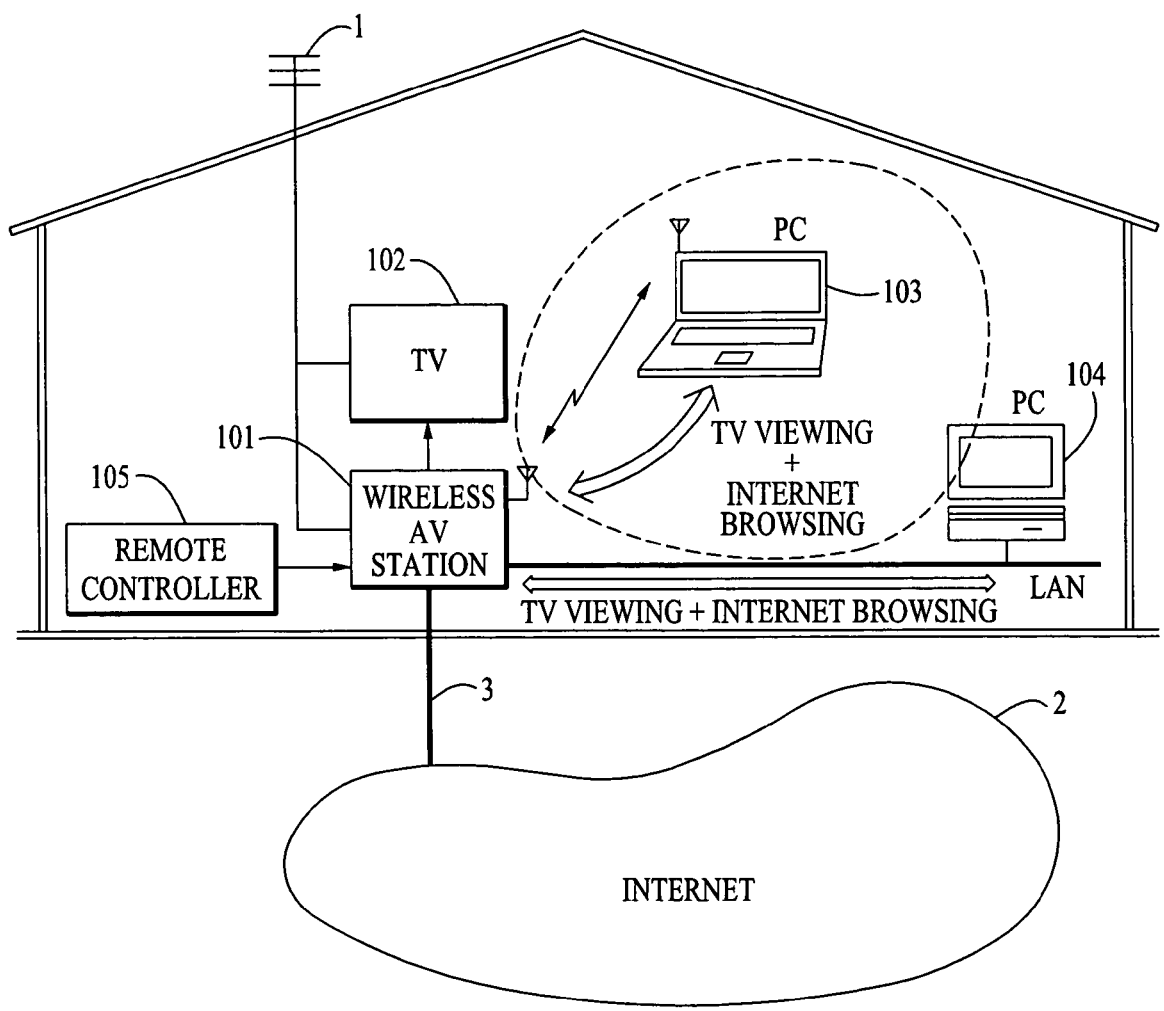
FIG. 1 is a view depicting an arrangement of a home network system employing an electronic appliance (wireless AV (Audio-Video) station) according to one embodiment of the invention.

FIG. 1 depicts an arrangement of a home network system employing an electronic appliance (wireless AV (Audio Video) station) according to one embodiment of the invention.

The home network system comprises a wireless AV station 101, a TV receiver 102, and various information-processing terminals, such as a notebook size personal computer 103 and a desktop personal computer 104. The wireless AV station 101 is a wireless electric transmission apparatus functioning as a home network server apparatus, and provides the various information-processing terminals in the home, such as the personal computers 103 and 104, with services regarding viewing of TV broadcast program data, Internet browsing, etc.

The wireless AV station 101 is linked to an external global network (external network), such as the Internet 2, via a communications line 3, such as an ISDN, an ADSL, and a CATV. Further, the wireless AV station 101 is connected to various information-processing terminals in the home via a wired network or a wireless network constructing the home network. The notebook size personal computer 103 is provided with a wireless communications device, and each personal computer 103 is thereby connected wirelessly to the wireless AV station 101. Also, the desktop personal computer 104 is connected to the wireless AV station 101 via a wired LAN.

The wireless AV station 101 connects the personal computers 103 and 104 to the Internet 2, and thereby allows data transmission and reception between Web sites on the Internet 2 and the personal computer 103 or 104.

An antenna cable connected to a TV broadcast receiving antenna 1 installed at the outdoors is withdrawn indoors, and the TV receiver 102 and the wireless AV station 101 are connected to the antenna cable. TV broadcast program data is not only played back on the TV receiver 102, but also received at the wireless AV station 101. The wireless AV station 101 has the capability to transmit the received TV broadcast program data to the notebook size personal computer 103 via the wireless LAN or to the desktop personal computer 104 via the wired LAN.

In other words, major functions provided by the wireless AV station 101 are as follows:

<Wireless Router Function (Internet Browsing Function)>

This is a function of connecting the respective information-processing terminals each having the communications capability via the wireless LAN to the Internet 2 and thereby allowing data transmission and reception between Web sites on the Internet 2 and the respective information-processing terminals. By using the notebook size personal computer 103 connected to the wireless AV station 101 via the wireless LAN, the user can perform Internet browsing wirelessly anywhere in the home. Of course, any desktop computer 104 connected to the wired LAN may perform internet browsing as well via the AV station 101.

<TV Viewing Function>

This is a function of transmitting TV broadcast program data received at the wireless AV station 101 to the respective information-processing terminals connected to the wireless AV station 101 via the wireless LAN or the wired LAN. In particular, by using the notebook size personal computer 103, the user can view a TV broadcast program currently on air wirelessly anywhere in the home, and any desktop computer 104 connected to the wired LAN may view TV broadcast.

<TV Recording and Playback Function>

The wireless AV station 101 includes a built-in magnetic disc drive device (hard disk drive: HDD), and therefore is able to record a given TV broadcast program into the magnetic disc drive device while, for example, allowing the user to view the TV broadcast program wirelessly, as for example, on notebook PC 103 connected to the wireless LAN and/or the desktop PC connected to the wired LAN. The wireless AV station 101 is also able to receive and record another TV broadcast program data currently on air into the magnetic disc drive device while transmitting the recorded TV broadcast program data from the magnetic disc drive device to one or more of the information-processing terminals (e.g., desktop PC 104 or notebook computer 103). Further, outputting the TV broadcast program data recorded in the magnetic disc drive device to the TV receiver 102 allows the user to view the TV broadcast program data on a large screen.

<Remote-Control Function>

The TV viewing function, the TV recording and playback function, etc. controlled by the wireless AV station 101 can be remotely controlled by each of the personal computers 103 and 104. Also, the TV viewing function, the TV recording and playback function, etc. controlled by the wireless AV station 101 can be also controlled by a dedicated remote controller 105 used exclusively to manipulate the wireless AV station 101.

In other words, the wireless AV station 101 is configured to operate in such a way its multiple functions are concurrently, remotely controlled by a plurality of remote controllers: the personal computers 103 and 104 operating as remote controllers and the dedicated remote controller 105. The wireless AV station 101 is characterized in that it enables concurrent, independent use of multiple functions by a plurality of remote controllers, which will be described in detail below.

It should be noted that the wireless AV station 101 may also provide a message board function used, for example, to exchange messages between the users of the personal computers 103 and 104 in addition to the above-specified functions.

FIG. 2 is a view depicting an appliance configuration of the wireless AV station 101.

As shown in FIG. 2, the wireless AV station 101 roughly comprises three components: a tuner/MPEG portion 21, a CPU portion 31, and a communications portion 41. The tuner/MPEG portion 21, the CPU portion 31, and the communications portion 41 are all connected to a bus 20 such as a PCI bus. Further, a magnetic disc drive device (HDD) 51 and a remote-control interface portion 61 are also connected to the bus 20.

The tuner/MPEG portion 21 executes reception processing for receiving TV broadcast program data, encoding processing for compression-encoding received TV broadcast program data, and decoding processing for decoding compression-encoded TV broadcast program data. As shown in the drawing, the tuner/MPEG portion 21 is provided with a TV tuner 211, an NTSC decoder 212, a multi-channel decoder 213, an audio analog-to-digital converter (audio ADC) 214, an MPEG-2 encoder 215, a RAM 216, a PCI bus interface (PCI-IF) 217, an MPEG-2 decoder 218, a RAM 219, an audio digital-to-analog converter (audio DAC) 220, etc.

The TV tuner 211 is connected to a TV antenna cable via a TV antenna connector 301. The TV tuner 211 is used to receive TV broadcast program data through a channel to which a viewing request is sent from the personal computer 103 or 104 or the remote controller 105, and therefore receives a TV broadcast signal and selects a channel as per the viewing request. The TV broadcast program data on a given channel received at the TV tuner 211 is separated into a video signal (moving pictures) and an audio signal, and converted further into digital data when necessary.

The NTSC decoder 212 is connected to a video input terminal 302, so that a video signal from an external video appliance, such as a DVD player and a VCR, can be inputted therein. A multi-channel signal superimposed on the TV broadcast program data is demodulated in the multi-channel decoder 213, after which it is sent to the audio analog-to-digital converter (audio ADC) 214 and converted into digital data. The audio analog-to-digital converter (audio ADC) 214 is also connected to an audio input terminal 303, so that an audio signal from an external audio/video appliance can be inputted therein.

The MPEG-2 encoder 215 compression-encodes both input videos and audio data. Herein, the MPEG-2 standard is adopted for compression encoding. The RAM 216 is used as a work memory for the MPEG-2 encoder 215 to perform compression-encoding processing. The TV broadcast program data received at the TV tuner 211 is compression-encoded in the MPEG-2 encoder 215, and is then converted into an MPEG-2 stream.

The PCI bus interface (PCI-IF) 217 is an interface that connects the tuner/MPEG portion 21 to the bus 20, and is used to enable communications between the CPU portion 31 and the HDD 51 via the bus 20. The PCI bus interface (PCI-IF) 217 accommodates a group of registers to which the CPU portion 31 can obtain access, and operations of each of the TV tuner 211 and the MPEG-2 encoder 215 are controlled by commands set in the group of registers by the CPU portion 31.

The MPEG-2 decoder 218 decodes the TV broadcast program data compression-encoded in an MPEG-2 format. For example, when the user wishes to view the compression-encoded TV broadcast program data recorded in the HDD 51 on the TV receiver 102, the compression-encoded TV broadcast program data is read out from the HDD 51 and sent to the MPEG-2 decoder 218 via the PCI bus interface 217 to be decoded (decompressed). The RAM 219 is used as a work memory for the MPEG-2 decoder 218 to perform decoding processing. Operations of the MPEG-2 decoder 218 are also controlled by commands set by the CPU portion 31 in the group of registers accommodated in the PCI bus interface 217.

The video data decoded in the MPEG-2 decoder 218 is sent to the TV receiver 102 via a video output terminal 305. Meanwhile, the audio data decoded in the MPEG-2 decoder 218 is converted into an analog signal in the audio digital-to-analog converter (audio DAC) 220 when necessary, after which it is outputted to an external audio/video appliance through an audio output terminal 304.

Further, in this embodiment, the TV broadcast program data decoded in the MPEG-2 decoder 218 may be sent to the MPEG-2 encoder 215 and subjected to compression-encoding processing again. This is done for down convert processing to convert a transmission rate (bit rate) of the compression-encoded TV broadcast program data recorded in the HDD 51 to a transmission rate specific to wireless transmission.

To be more specific, a transmission rate (bit rate) of TV broadcast program data obtained through the compression-encoding processing in the MPEG-2 encoder 215 varies with an image quality (low image quality, standard image quality, and high image quality) of TV broadcast program data to be recorded in the HDD 51. When a high quality is chosen, TV broadcast program data compression-encoded at a very high transmission rate is recorded into the HDD 51. There may be a case, however, that such TV broadcast program data cannot be sent in real time within a wireless communications band. In this case, the down convert processing is automatically executed to reduce the transmission rate of the TV broadcast program data to be transmitted wirelessly to a low value so as to match the transmission rate specific to wireless transmission.

The CPU portion 31 controls not only the TV tuner 211, the MPEG-2 encoder 215, and the MPEG-2 decoder 218 all in the tuner/MPEG portion 21, but also writing of data into the HDD 51 and reading of data from the HDD 51. Also, the CPU portion 31 receives a command for TV viewing sent from the personal computer 103 or 104 through communications with the communications portion 41, and transmits TV broadcast program data to be transmitted to the personal computer 103 or 104 to the communications portion 41. The CPU portion 31 comprises a CPU 311, a north bridge 312 connecting a CPU bus of the CPU 311 and the PCI bus 20, and a main memory 313.

The communications portion 41 is a communications control device that can operate by itself as a wireless LAN router. The communications portion 41 is arranged so that it can be connected wirelessly to the personal computer 103, and is also connected to the personal computer 104 via the wired LAN. In other embodiments, the wired LAN connected personal computer 104 may also be provided with wireless communication capabilities and thus may connect to the internet via the wireless AV station either wirelessly or via hard wire. The communications portion 41 connects the personal computers 103 and 104 to the Internet 2 at requests sent respectively from the personal computers 103 and 104, and thereby allows data transmission and reception between the personal computer 103 or 104 and the Internet 2. In this case, all the processing involved in data transmission and reception between the personal computer 103 or 104 and the Internet 2 is executed within the communications portion 41, and the CPU portion 31 is not used.

The communications portion 41 is provided with a control processor 411, a RAM 412, a ROM 413, a network controller 414, a wireless LAN device 415, a WAN connector 501, a LAN connector 502, etc.

The WAN connector 501 is a broadband connector used for data transmission and reception with the Internet 2 and connected to the communications line 3, for example, via a modem. The LAN connector 502 is connected to the wired LAN in the home.

The network controller 414 is a network control device that controls data transmission and reception with the Internet 2 via the WAN connector 501, and data transmission and reception with the wired LAN in the home via the LAN connector 502. The wireless LAN device 415 is a wireless communications device that allows data transmission and reception with any of the personal computers that have wireless communications capabilities via the wireless LAN, and communicates wirelessly with each wireless functioning personal computer via an antenna 416. A device conforming to IEEE 802.11b, IEEE 802.11a, for example, can be used as the wireless LAN device 415.

The control processor 411 controls data transmission and reception between the personal computer 103 or 104 and the Internet 2 by controlling the network controller 414 and the wireless LAN device 415. To be more concrete, the control processor 411 includes, as functions needed for the communications portion 41 to operate as a wireless router, an IP masquerade function, a NAT (Network Address Translation) function, a DHCP (Dynamic Host Configuration Protocol) function, etc. Further, the control processor 411 is also connected the PCI bus 20, and is furnished with a function of notifying the CPU 311, via the PCI bus 20, of a request (command) for TV viewing received from the personal computer 103 (and/or 104 if it has wireless communications capabilities) via the wireless LAN device 415, and notifying the CPU 311, via the PCI bus 20, of a request (command) for TV viewing received from the personal computer 104 on the wired LAN via the network controller 414.

Further, the control processor 411 is furnished with a function of, upon receipt of TV broadcast program data transferred from the CPU 311 via the PCI bus 20, transmitting the TV broadcast program data to the request-sender personal computer via the wireless LAN device 415 or the network controller 414. In this case, transmission processing of the TV broadcast program data to the request-sender personal computer is executed in parallel (that is simultaneously) with data transmission and reception between the request-sender personal computer and the Internet 2.

For example, in a case where TV broadcast program data requested by the personal computer 103 is transmitted wirelessly to the personal computer 103 while Internet browsing is performed on the personal computer 103 that is wirelessly connectable to the communications portion 41, the control processor 411 controls the wireless LAN device 415 in such a manner that contents data received from a Web server on the Internet 2 and the TV broadcast program data compression-encoded in the tuner/MPEG portion 21 are transmitted to the personal computer 103 simultaneously, as for example by time division through wireless communication. To be more concrete, the control processor 411 executes processing to multiplex the contents data and the compression-encoded TV broadcast program data, and the multiplexed contents data and TV broadcast program data are then transmitted to the personal computer 103 by time division through wireless communication. By transmitting the contents data and the TV broadcast program data to the personal computer 103 as discrete data in this manner, it is possible to display in different windows the contents data and the TV broadcast program data concurrently on the personal computer 103 with the use of an application program corresponding to each; moreover, the display positions and the display sizes of the respective windows of the contents data and the TV broadcast program data can be changed as needed by using the application program corresponding to each.

The foregoing functions of the control processor 411 are achieved by firmware stored in the ROM 413.

Figure 3:
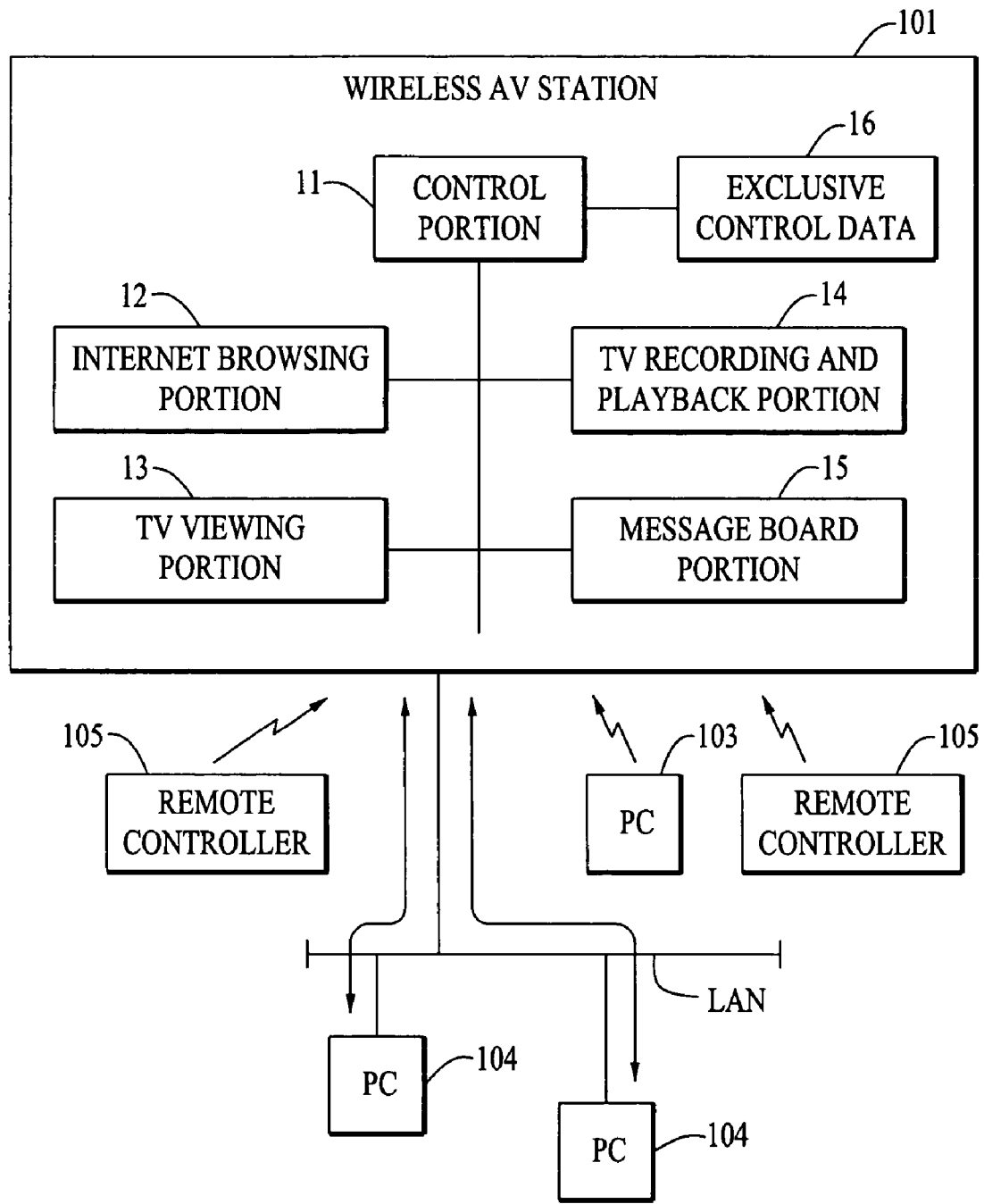
FIG. 3 is a functional block diagram depicting the wireless AV station according to the embodiment.

FIG. 3 is a functional block diagram of the wireless AV station 101.

As shown in FIG. 3, the wireless AV station 101 includes a control portion 11, an Internet browsing portion 12, a TV viewing portion 13, a TV recording and playback portion 14, and a message board portion 15 each as a processing portion, and an exclusive control data 16 as a data portion. These processing portions comprise various programs that are loaded in the main memory 313 and run on the CPU 311 in the CPU portion 31. Also, the data portion is constructed on the main memory 313 in the CPU portion 31 and on the HDD 51 to be used as an auxiliary storage.

The Internet browsing portion 12, the TV viewing portion 13, the TV recording and playback portion 14, and the message board portion 15 execute the above-described Internet browsing function, TV viewing function, TV recording and playback function, and message board function, respectively. These functions may be concurrently, remotely controlled by a plurality of remote controllers: the personal computers 103 and 104 operating as remote controllers and the dedicated remote controller 105, through the remote-control function described above. It is the control portion 11 that executes the remote-control function, and the control portion 11 executes exclusive control among all the functions with reference to the exclusive control data 16. Exclusive control means in this context, that the control portion has the ultimate authority to accept or deny a request for a function request by one of the remote control devices (collectively, personal computers 103, 104 and dedicated remote controller 105). In exercising exclusive or overriding control, the control portion 11 makes reference to and utilizes the data stored in the exclusive control data 16.

For example, the user B can use the TV viewing function while the user A is using the Internet browsing function, and the control portion 11 therefore permits the use of the TV viewing function by the user B. On the contrary, for example, the user B cannot use the TV recording and playback function while the user A is using the TV viewing function, and the control portion 11 therefore rejects the use of the TV recording and playback function by the user B (assuming user A was already using the TV viewing function). To enable such exclusive control by the control portion 11, the exclusive control data 16 retains information, for example, as shown in FIG. 4 or FIG. 5.

Figures 4, 5:
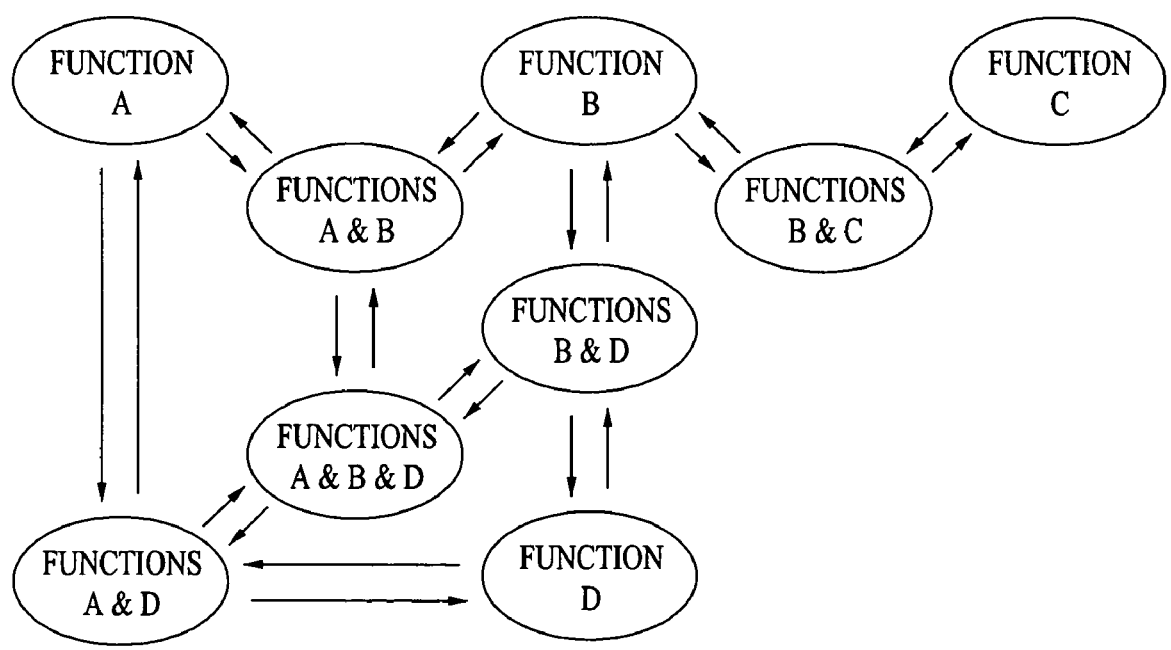
FIG. 4 is a first view showing the content of exclusive control data retained in the wireless AV station according to the embodiment.
FIG. 5 is a second view showing the content of exclusive control data retained in the wireless AV station according to the embodiment.

FIG. 4 shows an example case where exclusive relations among all the functions are retained in the form of a table, in which combinations of requested functions and any function needing exclusive control are retained. For example, upon receiving a request of the use of a function A, the control portion 11 searches through the exclusive control data 16 using the function A as a key, and obtains a function C as a function needing exclusive control, that is, function C, if already being utilized, would exclude the use of function A. Thus, the control portion 11 checks whether the function C is in use, and decides whether the use of the function A is permitted based on whether or not function C is already in use.

On the other hand, FIG. 5 shows an example case where exclusive relations among all the functions are retained in the form of a state transition diagram, in which are retained combinations of a current state and any state to which transition can take place from the current state. For example, when the use of a function B is requested while a function A alone is in use, because transition to the functions A and B can take place based on the state transition diagram, the control portion 11 decides that the use of the function B should be permitted. Also, when the use of a function C is requested, because transition to the functions A and C cannot take place, the control portion 11 decides that the use of the function C should be rejected.

For the exclusive control to be executed, it is necessary to identify all the remote controllers uniquely. As to the personal computers 103 and 104 connected through the wired or wireless network, identifiers assigned on their respective networks can be used. As to the dedicated remote controller 105, for example, a dip switch used to set an identification number may be provided to each remote controller 105, so that an identification number specific to each remote controller 105 can be assigned according to the settings of the dip switch.

Figure 6:
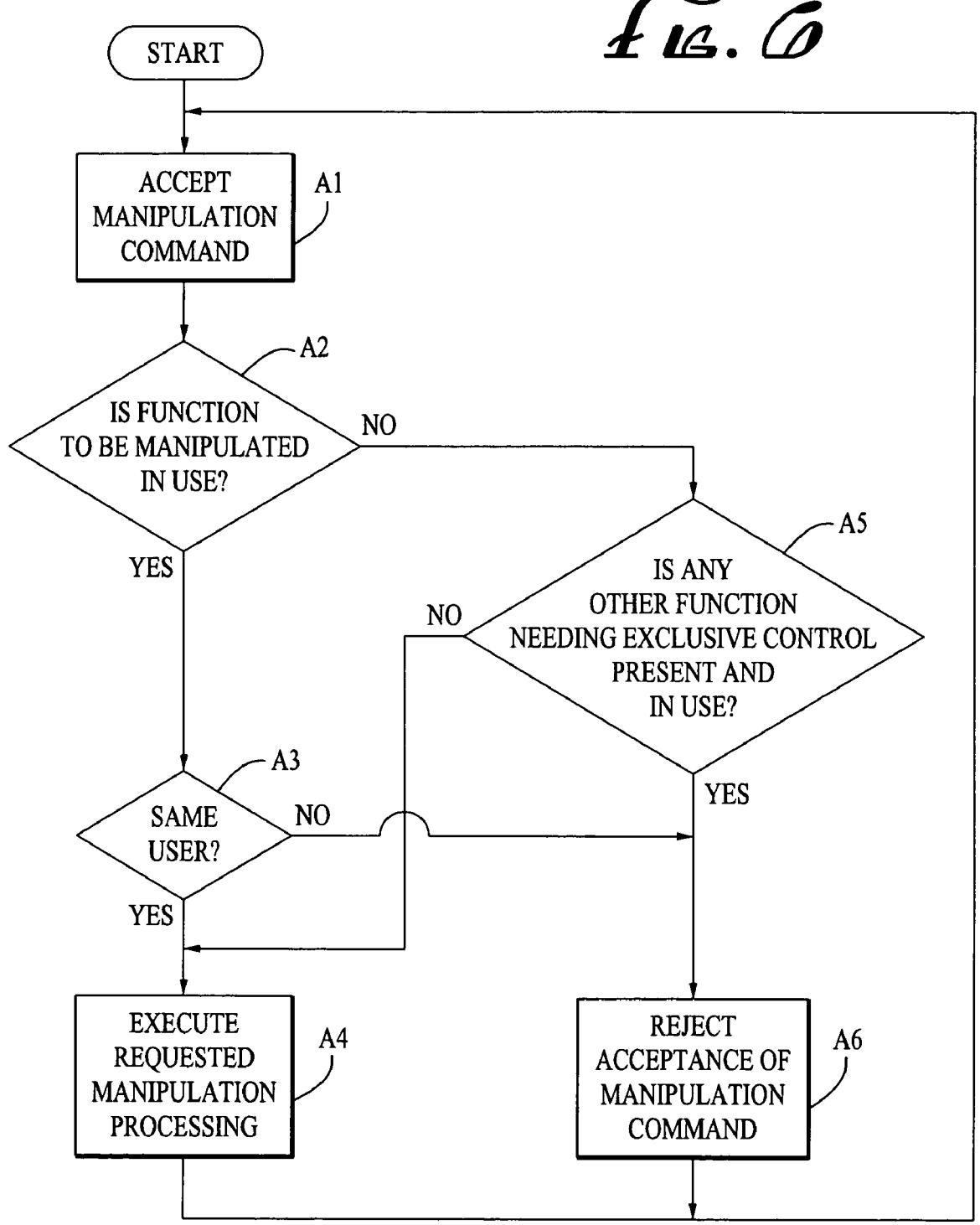
FIG. 6 is a flowchart detailing an operation procedure of exclusive control among multiple functions executed by the wireless AV station according to the embodiment.

FIG. 6 is a flowchart detailing an operation procedure for the exclusive control among multiple functions executed by the wireless AV station 101.

Upon receipt of a manipulation command (Step A1), the control portion 11 first checks whether the function to be manipulated at the manipulation command is in use (Step A2) When the function to be manipulated is in use (YES in Step A2), the control portion 11 checks whether the function to be manipulated is in use at a manipulation command from the same remote controller, that is, whether a new manipulation command is sent from the same user (Step A3). In the case of the same user (YES in Step A3), the control portion 11 executes the processing corresponding to the manipulation command under control (Step A4). On the other hand, in the case of another user (NO in Step A3), the control portion 11 rejects the request of the manipulation command (Step A6).

When the function to be manipulated at the manipulation command is not in use (NO in Step A2), the control portion 11 then refers to the exclusive control data 16, and checks the presence of any other function needing exclusive control with respect to the function to be manipulated, and upon confirmation of the presence, it further checks whether such a function needing exclusive control is in use (Step A5). In a case where any other function needing exclusive control with respect to the function to be manipulated is absent, or is present but not in use, (NO in Step A5), the control portion 11 executes the processing corresponding to the manipulation command under control (Step A4). On the other hand, in a case where any other function needing exclusive control with respect to the function to be manipulated is present and is in use (YES in Step A5), the control portion 11 rejects the request of the manipulation command (Step A6).

In accordance with other embodiments of the invention, the users of remote control devices 103, 104 and 105 may be notified in the event certain functions become available, especially in the case that these function were requested but rejected by the control portion 11 of the wireless AV station. Such notification is particularly advantageous in the case where different users are in different rooms and the availability of a function (such as TV recording) is not readily apparent to a user.

An explanation will now be given to operation procedures of the wireless AV station 101 and the personal computers 103 and 104 when notifying the user of the availability with reference to FIG. 7 through FIG. 10.

Figure 7:
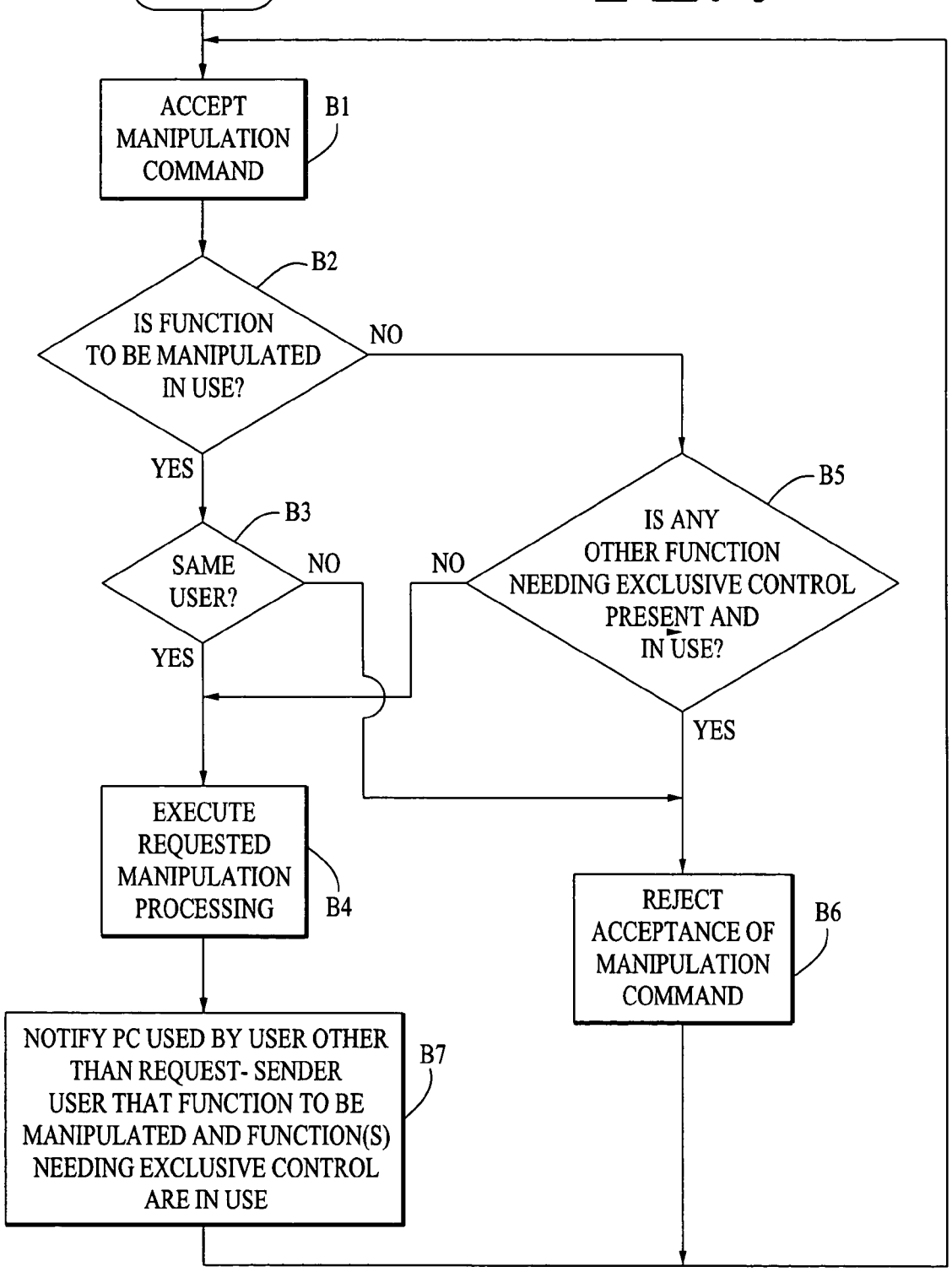
FIG. 7 is a flowchart detailing an operation procedure of the wireless AV station according to the embodiment upon receipt a manipulation command from any of remote controllers.

FIG. 7 is a flowchart detailing an operation procedure of the wireless AV station 101 upon receipt of a manipulation command from any of the remote controllers. Step B1 through Step B6 correspond respectively to Step A1 through Step A6 of FIG. 6 described above. In the operation procedure shown in FIG. 7, Step B7 is added, in which the control portion 11, having executed the processing corresponding to the manipulation command under control in Step B4, notifies the other personal computer 103 or 104 that has not sent a manipulation command that the function to be manipulated and the function(s) needing exclusive control with respect to the function to be manipulated are in use.

For example, assume that there is a first and second controller. Initially, the first controller sends a manipulation command to the control portion 11 of the wireless AV station 101. The manipulation command results from some manipulation of the first controller and serves as a request signal to the control portion 11. Assuming that this is the first request signal, the request will be granted and the wireless AV station 101 will activate control of the corresponding requested function (e.g., watching TV) for access by the user of the first controller.

Now assume a second user manipulates the second remote controller which sends a second request signal to the control portion 11 of the AV station 101. The control portion 11 may accept the second request if the function corresponding to the request is available and is not excluded by use of another function being used (by the first user/controller), or, the request signal maybe rejected if the function being requested by the second controller is already being used or is excluded by the function already being used by a first controller. Upon rejecting the request, a notification is performed by the control portion 11 transmitting a notification signal (e.g., an indicator signal) to the second remote controller.

The first and second remote controllers both have a visual and/or audible device which is activated upon receipt of the notification signal. In the case of the remote controllers being personal computers, an icon on the computer screen may be programmed to change in intensity, shape or color in response to receipt of the notification signal or a visual indicator may otherwise be displayed by the application running the PC. Further, the normal sound card and speaker on the PC may be used to alternatively or additional provide an audible indication to the user. In the case of a dedicated remote, such a remote may have a specialized LED activated upon receipt of the notification signal and may be provided with a simple audible generator to provide an audible indication to the user thereof.

Figure 8:
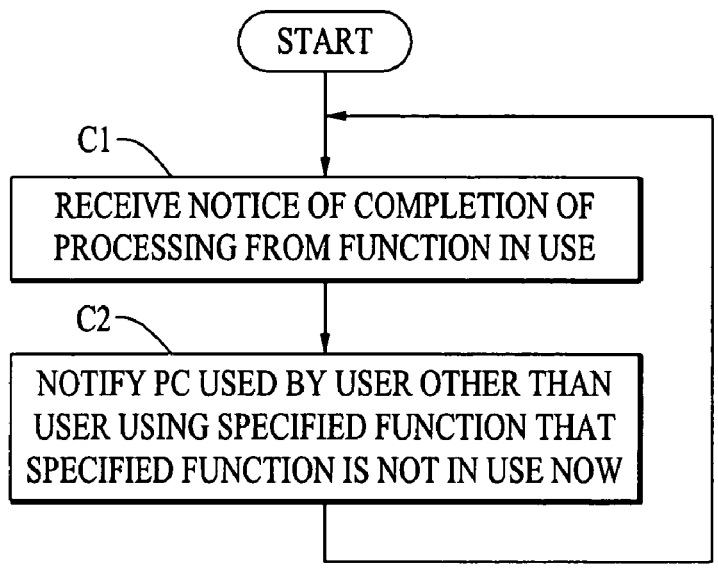
FIG. 8 is a flowchart detailing an operation procedure of the wireless AV station according to the embodiment upon receipt of a notice of completion of processing from a function in use.

Also, FIG. 8 is a flowchart detailing an operation procedure of the wireless AV station 101 when a notice of completion of processing is received from the function in use. Upon receipt of this notice (Step C1), the control portion 11 notifies the other personal computer 103 or 104 that has not been using the function specified in the notice that the specified function and the function(s) needing exclusive control with respect to the specified function are not in use now (Step C2). The notification may again take place by providing a notification signal to the remote controllers, which, upon receipt by the remote controllers, activates a visual and or audible indicator.

Figure 9:
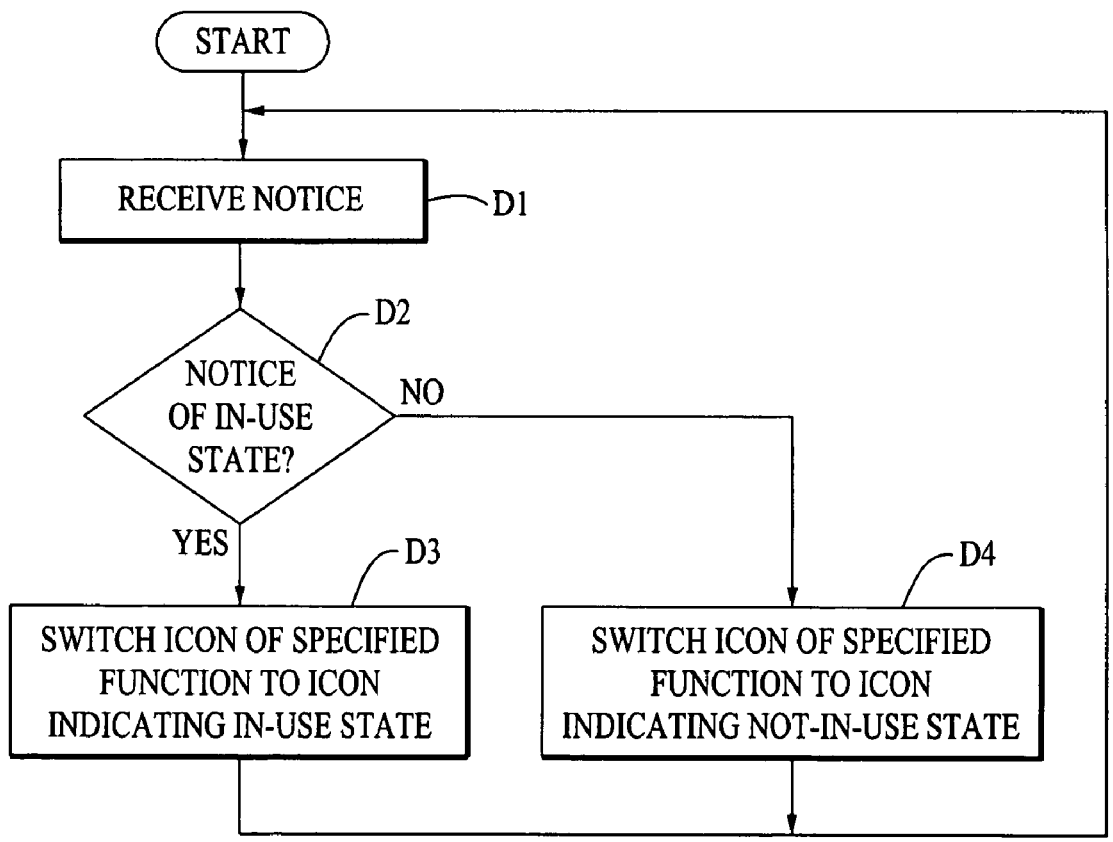
FIG. 9 is a flowchart detailing an operation procedure of a personal computer operating as a remote controller in the embodiment, upon receipt of a notice from the wireless AV station.

On the other hand, FIG. 9 is a flowchart detailing an operation procedure of the personal computer 103 or 104 upon receipt such a notice. Upon receipt of the notice (Step D1), the personal computer 103 or 104 first checks whether the notice indicates an in-use state (Step D2). When the notice indicates an in-use state (YES in Step D2), the personal computer 103 or 104 switches an on-screen indicator, such as an icon, to indicate that the particular function is in use. (Step D3). Generally, a plurality of icons will be displayed on the computer screen indicating the in-use or availability state of a corresponding plurality of functions.

When the notice does not indicate an in-use state, in other words, indicates a not-in-use state (NO in Step D2), the personal computer 103 or 104 switches the appropriate icon for the function specified in the notice to an icon indicating a not-in-use state (Step D4). In this way the user may readily determine whether a desired function may now be used. Of course, alternative methods of providing a visual notice to the PC user may be employed such as a pop-up indicator, a blinking indicator, change in color and/or intensity of a displayed indicator just to mention a few. Many alternative modes of providing an indicator will be apparent to those skilled in the art. Alternatively or additionally, an audible indicator may be provided.

Figure 10:
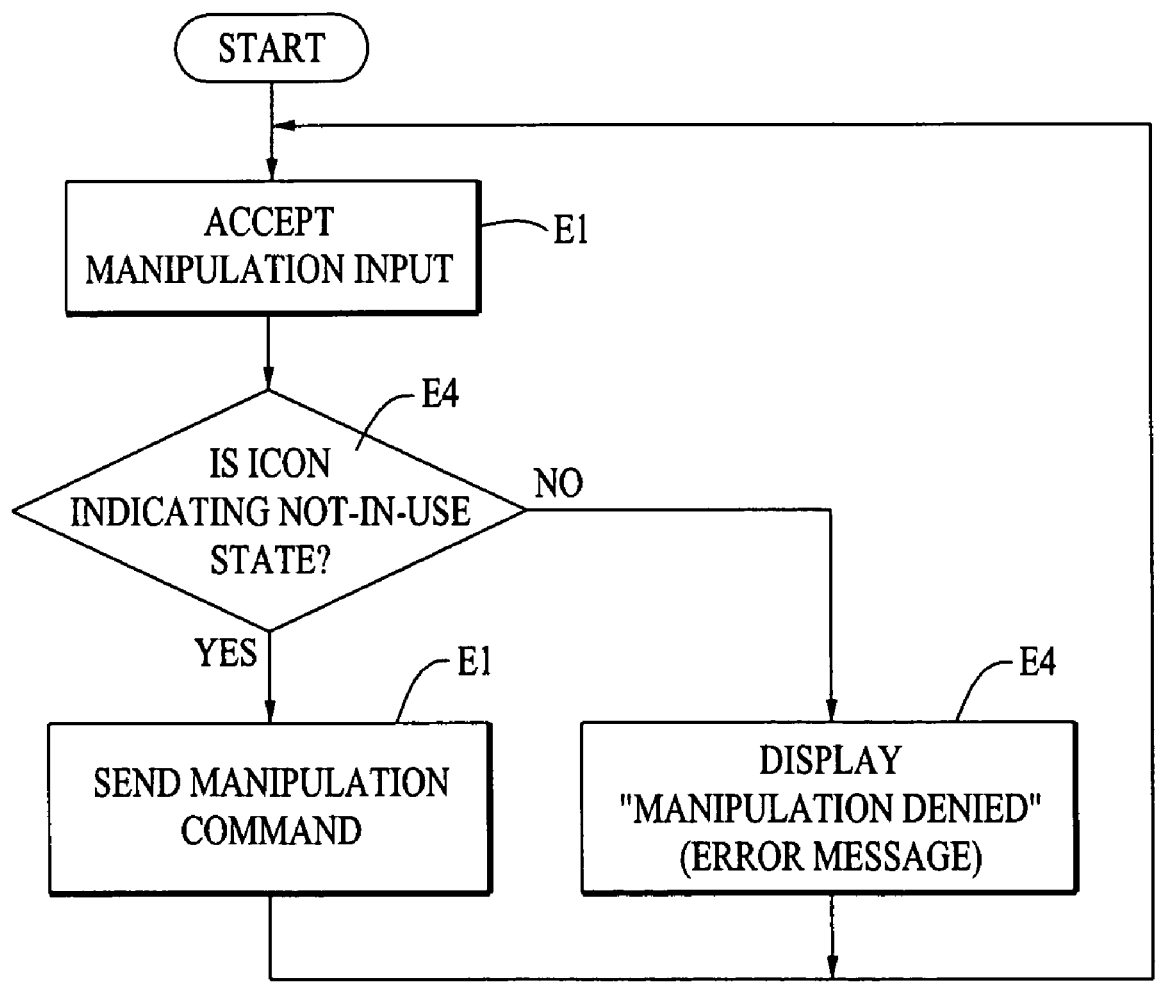
FIG. 10 is a flowchart detailing an operation procedure of a personal computer operating as a remote controller in the embodiment, upon receipt of a manipulation input from the user.

Also, FIG. 10 is a flowchart detailing an operation procedure of the personal computer 103 or 104 upon receipt of a manipulation input from the user. A manipulation input is simply a user action which may take place, for example, by the user depressing keys on the personal computer keyboard or performing a mouse click operation on an icon in which the user attempts to initiate some function such as watching live TV, recording a broadcast, playback a previously recorded broadcast etc. In the example of using an icon on the compute screen to activate functions, upon receipt by the personal computer of the manipulation input (Step E1), the personal computer 103 or 104 checks whether the icon of the function requested by the manipulation indicates a not-in-use state (Step E2), and when the icon indicates the not-in-use state (YES in Step E2), the personal computer 103 or 104 transmits a manipulation command to the wireless AV station 101 (Step E3). On the other hand, when the icon indicates an in-use state (NO in Step E2), the personal computer 103 or 104 displays an error message indicating that the manipulation is denied (Step E4). As in the above examples, an audible indication may alternatively or additionally be provide to the user by the personal computer.

Consequently, the user using, for example, the personal computer 103 or 104 as the remote controller of the wireless AV station 101 in another room can know whether the respective functions controlled by the wireless AV station 101 are available. Also, a useless communication (transmission and reception of a manipulation command for an unavailable function) with the wireless AV station 101 can be avoided.

It should be appreciated that the invention of the present application is not limited to the embodiment above, and the invention can be modified in various manners when reduced to practice without departing from the scope of the gist of the invention. Further, the embodiment above includes inventions at various stages, and various inventions can be extracted by adequately combining a plurality of constituent features disclosed herein. While a personal computer has been described in some embodiments as serving as a remote controller, it is clear that in other embodiments of the invention other devices having a data processing, display and transmission (wireless or via wire) capabilities may also be used as, for example, cell phones and PDA's.

What is claimed is:

1. An electronic apparatus furnished with multiple functions that are remotely controllable by at least a first and second remote controller, said apparatus comprising:
    a first module for activating a first function;
    a second module for activating a second function;
    a control unit for accepting a request from said second remote controller and activating the second-function while activating the first function at a request from said first remote controller; and
    storage means for storing control data used to execute exclusive control on two or more of said multiple functions that are not usable concurrently;
    wherein said control unit decides, among all functions other than a given function, which are usable while said given function is activated and which are not, based on the control data stored by said storage means.

2. The electronic apparatus according to claim 1, wherein:
    said control unit includes means for accepting a request for said first function while said first function is activated in a case that the request is sent from said first remote controller and rejecting the request for said first function in a case that the request is sent from said second remote controller.

3. The electronic apparatus according to claim 1, wherein:
    said control unit includes means for notifying said second remote controller, upon activation of said first function, that said first function has become unavailable.

4. The electronic apparatus according to claim 3, wherein:
    said control unit includes means for notifying said second controller, upon deactivation of said first function, that said first function has become available.

5. The electronic apparatus according to claim 1, wherein:
    said control unit includes means, upon activation of said first function, for notifying said second remote controller that said first function and any function, indicated by the control data as not being usable concurrently with said first function, have become unavailable.

6. The electronic apparatus according to claim 5, wherein:
    said control unit includes means, upon deactivation of said first function, for notifying said second remote controller that said first function and any function, indicated by the control data as not being usable concurrently with said first function, have become available.

* * * * *